June 14, 1949.  F. J. BLUME  2,472,805
MULTIPLE BELT CONVEYER SYSTEM
Filed Aug. 18, 1945  4 Sheets-Sheet 1

Inventor
Frank J. Blume
by Frank J. Schraeder Jr.
Attorney

June 14, 1949.　　　　F. J. BLUME　　　　2,472,805
MULTIPLE BELT CONVEYER SYSTEM
Filed Aug. 18, 1945　　　　4 Sheets-Sheet 2

Inventor
Frank J. Blume
by Frank J. Schraeder Jr.
Attorney

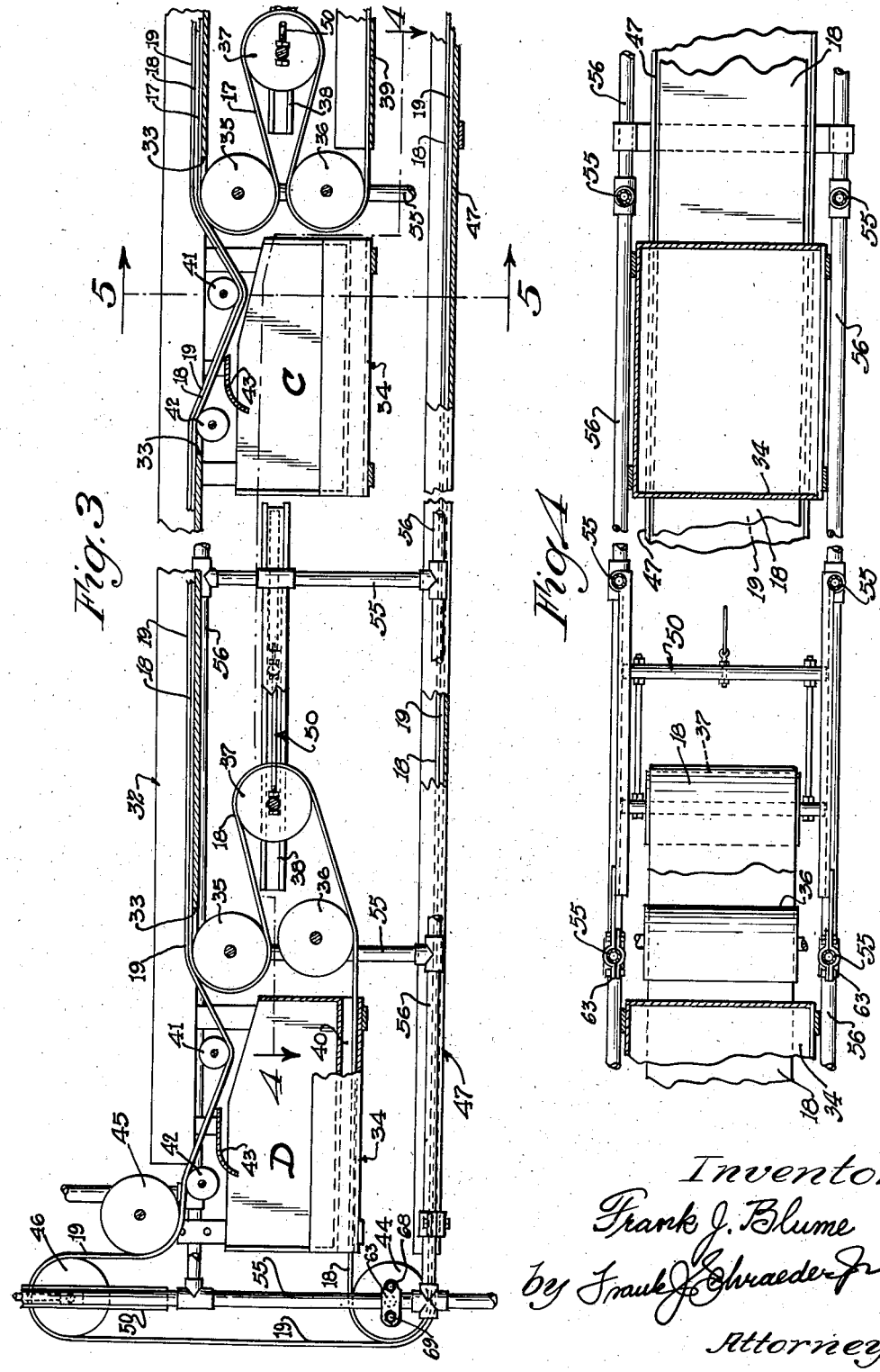

June 14, 1949.  F. J. BLUME  2,472,805
MULTIPLE BELT CONVEYER SYSTEM
Filed Aug. 18, 1945  4 Sheets-Sheet 4
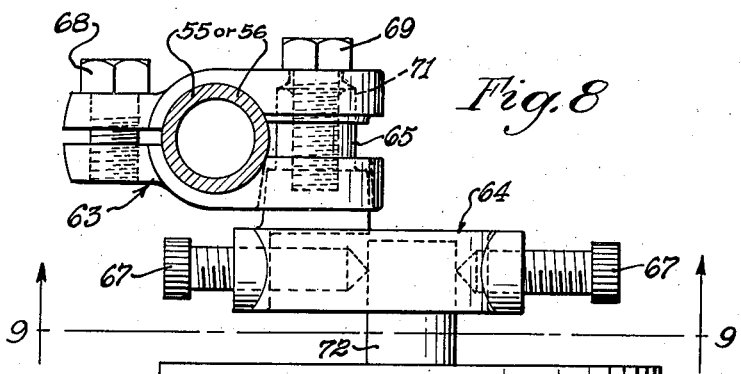
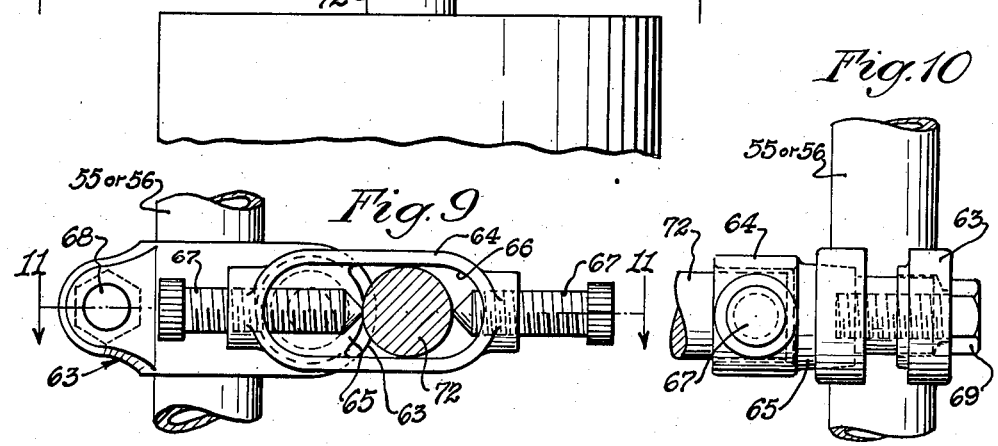
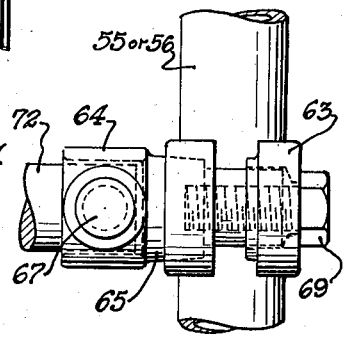
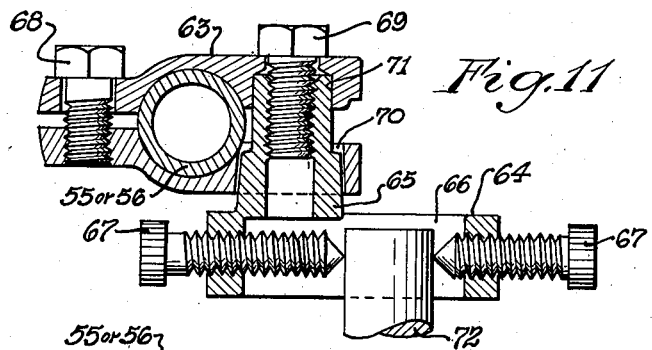
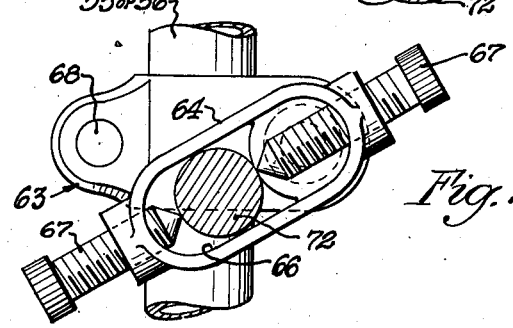
Inventor
Frank J. Blume
by Frank Schraeder
Attorney.

Patented June 14, 1949

2,472,805

UNITED STATES PATENT OFFICE 2,472,805

MULTIPLE BELT CONVEYER SYSTEM

Frank J. Blume, Chicago, Ill.

Application August 18, 1945, Serial No. 611,359

1 Claim. (Cl. 198—165)

The present invention relates to that type of conveyor in which papers or other light articles are carried from one point to another while gripped between two endless belts that normally lie in face to face contact with each other, except at receiving and sending stations, where they are separated respectively to admit or discharge such articles; and it has for its main object to produce an improved and simplified system whereby articles may be sent from a master or distributing station directly to and deposited at each of any desired number of remote receiving stations.

Viewed in a specific aspect, the present invention may be said to have for its object to produce a system in which only as many belts are needed as there are stations, including the master station, to provide individual service to each receiving station, instead of twice that number which would be needed if each receiving station were connected to the master with a separate two-belt conveyor.

In some systems articles may be returned from a receiving station to the master or distributing station on a belt running through a trough connecting such stations together. Viewed in one of its aspects, the present invention may be said to have for an object to produce a system in which one of the belts for carrying articles to the receiving stations, in cooperation with a single trough, suffices to return articles from any and all of the receiving stations to the master station.

Figure 1:
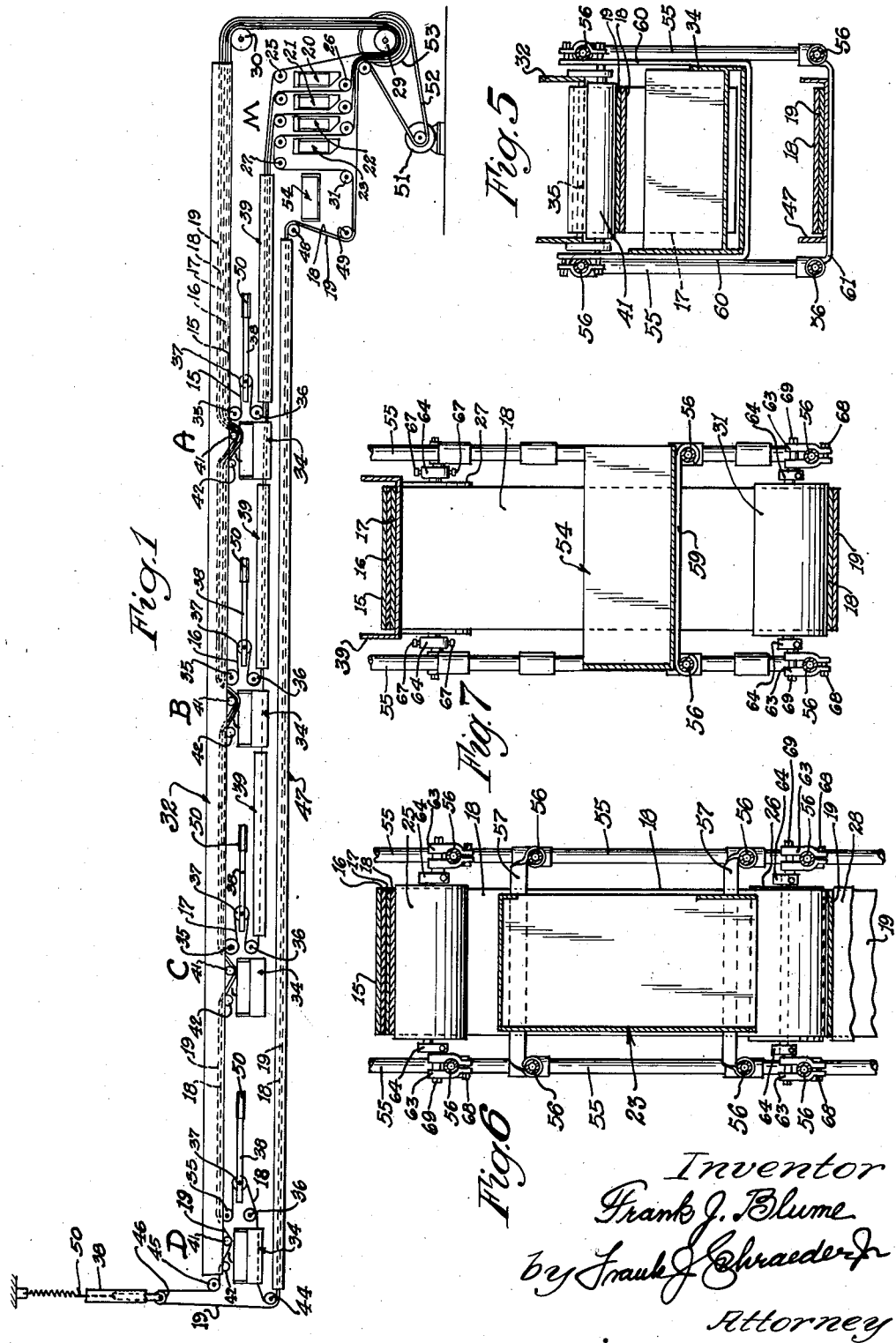
Figure 2:
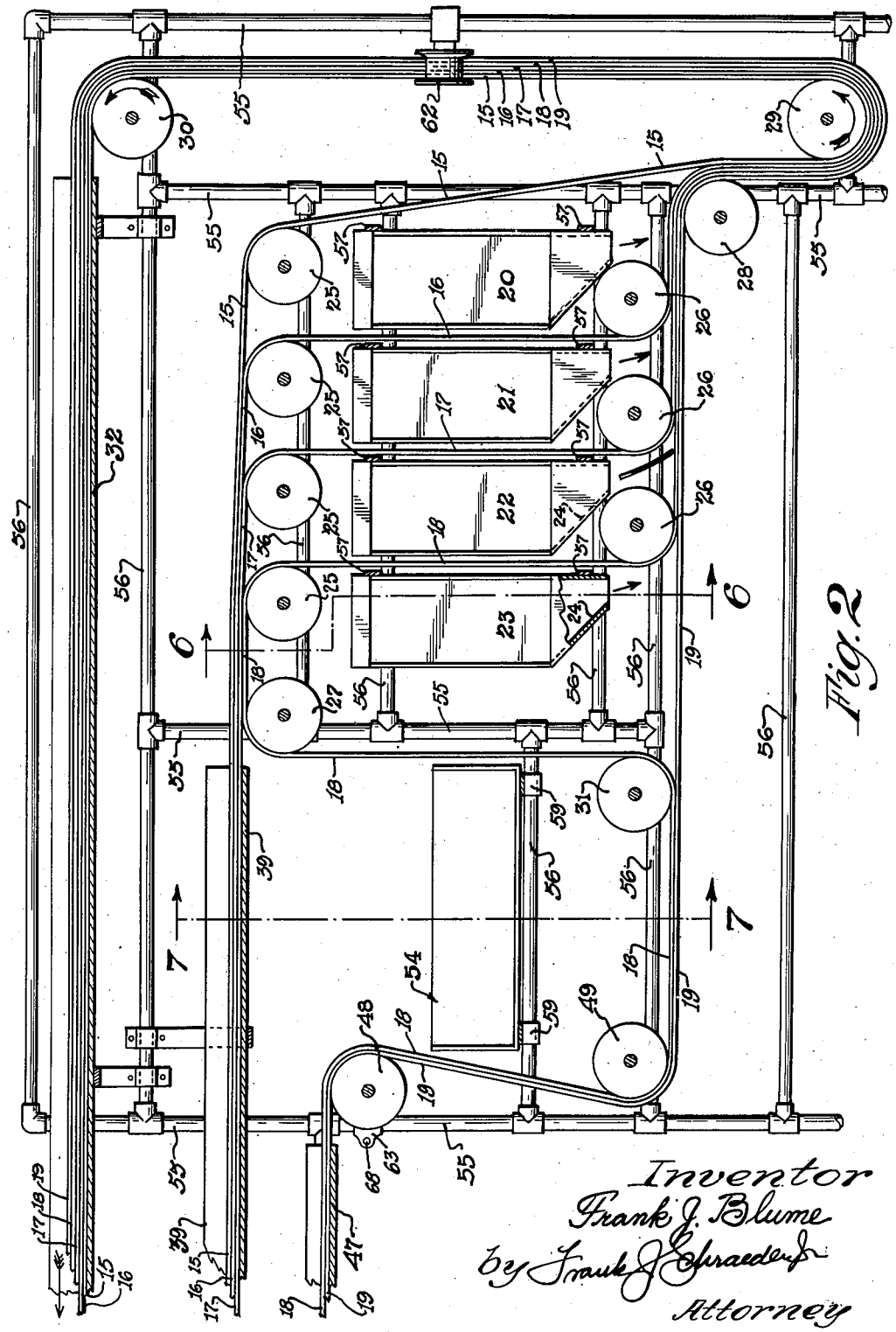

The various features of novelty whereby the present invention is characterized will hereinafter be pointed out with particularity in the claim; but, for a full understanding of the invention and its objects and advantages, reference may be had to the following detailed description taken in connection with the accompanying drawings, wherein:

Figure 1 is a side elevation illustrating, more or less diagrammatically, a conveyor system embodying the present invention; Fig. 2 is a view, partly in side elevation and partly in section, on a much larger scale than Fig. 1, showing only the master station end of the system; Fig. 3 is a view similar to Fig. 2, illustrating the two stations most remote from the master station; Fig. 4 is a section on line 4—4 of Fig. 3; Fig. 5 is a section on line 5—5 of Fig. 3; Figs. 6 and 7 are sections taken respectively on lines 6—6 and 7—7 of Fig. 2; Fig. 8 is an elevational view of a device for adjustably supporting the ends of shafts for rollers over which conveyor belts run, fragments of a roller and a tubular frame element being also shown; Fig. 9 is a section on line 9—9 of Fig. 8; Fig. 10 is an elevational view of the parts appearing in Fig. 9, looking at the same from a point to the right of Fig. 9; Fig. 11 is a section on line 11—11 of Fig. 9; and Fig. 12 is a view similar to Fig. 9, the roller shaft being in a different position, angularly and radially of, the hinge axis in the device.

In the drawings I have illustrated a system comprising five stations one of which is the master distributing or sending station M, while four are receiving stations, A, B, C and D; and, for the sake of brevity, the detailed description will be confined to this particular embodiment, although there may be fewer or an indefinitely greater number, as desired.

There being five stations, five endless belts, 15, 16, 17, 18 and 19, are used. These belts all run over parallel horizontal rollers with the longitudinal center lines of the belts disposed in the same vertical plane, so that the group of belts contains four article-receiving openings within the same. On leaving the master or sending station the belts lie flat against each other and remain so until the first receiving station is reached where the lowermost belt peels off and starts back toward the master station. As the lower belt separates from the next higher one, articles that were being carried between these two belts are dropped at the first receiving station. At each succeeding station another belt peels off from the under side, causing articles intended for that station to be dropped there.

At the master station are four receptacles 20, 21, 22 and 23 arranged in a row in the plane of the group of belts and spaced a little apart from each other. These receptacles are open on a side that parallels said plane and at the bottom; the openings at the bottoms being slot-like at the lower ends of downwardly inclined bottom wall members 24. Directly above each receptacle is a transverse roller 25 rotatable about an axis at right angles to said plane. Below the receptacles are three rollers 26 that are located under the first three receptacles 20, 21 and 22. There is a roller 27, similar and parallel to rollers 25, inwardly from the group of receptacles, making five rollers in the upper group. Below and parallel to the group of rollers 26, and outwardly from the first roller of this group, is a roller 28. Below and outwardly from roller 28 is a roller 29, while directly above roller 29, and at a level higher than that of rollers 25, is a roller 30; the axes of these two additional rollers being parallel to the axes of the other rollers. There is still another roller, 31, a little inwardly from the receptacles and inwardly from and at the same level as the rollers 26.

The rollers just described guide the belts at the master or sending station in a manner to separate them for the purpose of receiving articles between them, after which they come together again to grip the articles and carry them away. As the belts approach the receptacles at the master station, belts 18 and 19 pass under roller 31, the latter belt continuing straight ahead and over the top of roller 28. Belt 18 travels up from roller 31, across the tops of roller 27 and the nearest roller 25, then down between receptacles 23 and 22 and underneath all of the rollers 26. Articles placed in receptacle 23 drop down on belt 19 and are almost immediately gripped between that belt and belt 18 so as to be carried along to the fourth or most remote receiving station D and discharged, as will hereinafter be explained. Belt 17 comes in over that part of belt 18 that overlies roller 27 and the adjacent roller 25 and proceeds to the next roller 25 and down between receptacles 22 and 21 and under the intermediate roller 26. Thus articles deposited in receptacle 22 drop on belt 18 and are clamped between that belt and belt 17, to be carried to the third receiving station C. In the same way belts 16 and 15, overlying each other and belt 17, pass over the last two rollers 25, one travelling down between receptacles 21 and 22 and cooperating with belt 17 to grip articles dropping from receptacle 21 upon the latter belt, and the other passing down outwardly from receptacle 20 directly to roller 28 where all five belts meet. Thus articles are gripped between belts 17 and 16 and between belts 16 and 15, for delivery to the second and first receiving stations, B and A, respectively. After passing roller 28 and then under roller 29, all five belts travel up to and over roller 30 and start laterally on their journey to the receiving stations.

Upon leaving the roller 30, the belts enter a shallow trough 32 that extends past the first three receiving stations and to the fourth of these stations. The bottom wall of the trough is cut away at each receiving station, as is best shown in Fig. 3, to provide a large opening 33 through which articles are delivered from the belts; there being an open-top box 34 below each opening 33 to receive such articles.

The construction at each of the first three receiving stations is exactly alike, so only one of them, namely the third station, C, appearing in Fig. 3, is illustrated in detail. Below the trough at this and the other receiving stations is a transverse roller 35 extending up into one end of the opening 33, while below this roller is a similar roller 36, both being rotatable about stationary axes. A third roller 37 is mounted in bearings that are movable lengthwise of suitable stationary longitudinal guides 38. At each opening in the bottom of the trough, the lowermost belt, belt 17 at station C in Fig. 3, passes down around roller 35, back over the top of and down underneath roller 37, forward to roller 36 and finally half way around the latter to begin its return journey toward the master station M. A sectioned trough 39 is provided for the return runs of the belts from receiving station C to master station; the boxes 34 having tunnels 40 through the same below the effective bottoms of the same and registering with such tunnel sections.

Those belts which are not peeled off at a receiving station pass under an idler roller 41 below the trough 32 and above the receiving box and over a second idler roller 42, back into the trough and onward toward the next station. The reason for deflecting the upper belts downward over the receiving boxes is to direct the delivered articles downwardly into the boxes. Blade-like devices 43 are placed in the receiving boxes with their edges near the belts to serve as strippers when papers or other articles adhere to the belts and might otherwise be carried past the station.

The arrangement at station D is slightly different from that at the other receiving stations. Belt 18, after being peeled off, passes over rollers 35 and 37 in the same way as is done at the other stations, but is led under roller 36 so as to continue to travel forward instead of rearward. At the extreme end of the apparatus is a roller 44; belt 18 passing forward over the top of this roller and then back underneath the same to begin its return journey to the master station. After belt 18 has been peeled off there remains only belt 19 which, after leaving rollers 41 and 42, is led under a transverse roller 45 and then up over a roller 46 and down to and under roller 44, so as to be brought underneath belt 18. Belts 18 and 19 now travel together through a trough 47 that reaches to the master station. At the master station these two belts pass over a roller 48 and down to and under a roller 49 to roller 31 where the cycle started.

The reason why rollers 37 and 46 are slidably supported is to permit them to move bodily to keep the corresponding belts taut. As best shown in Figs. 1 and 4, simple tension devices 50 are attached to these rollers to maintain a constant pull on the rollers 37 and 46.

The belts may conveniently be driven by means of a motor 51 that turns roller 29 through a belt 52 that passes around a pulley 53 fixed to that roller.

With the apparatus heretofore described, each receiving station has papers or other small articles delivered to it in just the same manner as though the apparatus were designed to deliver to that station alone. It is also possible for each receiving station to send articles directly back to the master station, namely through trough 47 on top of the belts returning through the trough to the sending station. All that needs be done to start a paper or other article on its way from any receiving station is to drop it into trough 47 on top of belt 18. When any article reaches the point where belts 19 and 18 turn downward, over roller 48 at the master station, it falls into a box 54 placed there to receive it. The operator can easily sort the articles so received and, if any should be articles which had been sent to a wrong station, drop them into the receptacle corresponding to the station for which it was destined.

The framework for supporting the apparatus heretofore described may take any usual or preferred form. Since it is common practice to employ pipes or tubes for this purpose, I have disclosed means for improving the apparatus as a whole when using a framework of that type. The framework illustrated consists mainly of upright and horizontal longitudinal pipes or tubes 55 and 56, respectively, forming two side frames, together with short transverse connecting pieces.

As best shown in Fig. 6, receptacles 20 to 23 at the master station have near the top and bottom laterally projecting arms 57, the free ends of which are bent around upper and lower longitudinal frame elements on opposite sides thereof; these arms therefore serving as cross braces for the frames. The box 54 rests on other longitudinal frame elements, as best shown in Fig. 7, and has secured to the under side thereof straps 59 the ends of which are bent around these frame elements.

The receptacles 34 at the receiving stations are suspended in U-shaped hangers 60, the free ends of the arms of which are bent around longitudinal pipes in the framework at the level of the upper trough 32, as best shown in Fig. 5. Fig. 5 also illustrates the manner of supporting trough 47, namely in very shallow U-shaped hangers 61 the free ends of the arms of which are bent around the lowermost longitudinal pipes of the frame structure.

In order that the belts shall register accurately and be held together until they enter trough 32 after leaving the filling point, I have mounted on the endmost uprights, at the sending end, a pair of sheaves 62, (of which only one is shown), grooved to embrace opposite edges of the grouped belts about midway between rollers 29 and 30.

Because some of the rollers must be more accurately adjusted than is possible in the case of ordinary bearings that can be attached to the tubular frame members, bearings in special adjustable brackets have heretofore been used. Figs. 8 to 12 illustrate an improved adjustable device for this purpose and these devices adapted to support the ends of the shafts of the belt-engaging rollers from the vertical and horizontal pipes respectively 55 and 56. Aside from the screws, the device comprises only three pieces, namely a two piece clamp 63 adapted to be positioned anywhere along the pipe and be firmly held there, and a swinging arm member 64. The arm member has a tubular stub shaft 65 projecting from one side, near one end, that is adapted to enter a bearing in the clamp member and permit the arm to be fixed to the clamp in any position angularly of the axis of the trunnion. The arm contains a slot 66, as wide as the diameter of a roller shaft generally designated by numeral 72, and extending throughout almost the entire length of the arm. Set screws 67 extend into the slot through the end edges of the arm, their axes registering with the longitudinal center of the slot. The length of the slot is preferably more than twice the diameter of the shaft so that, with an end of the shaft entered in the slot between the inner ends of the screws, it may be adjusted radially of the arm through a distance greater than its diameter. Therefore after the clamp has been placed at approximately the correct position on the supporting pipe, and its screw 68 thereof has been tightened, the shaft may be raised or lowered or be shifted lengthwise of the supporting pipe; or be shifted in both of these ways. This is accomplished through loosening the screw 69 that holds the arm fast and then swinging the arm up or down, or through adjusting the screws 67 to shift the roller shaft lengthwise of the arm 64.

It shall be noted that the stub shaft 65 passes loosely through the opening 70 in one member of the clamp, so as not to interfere with the freedom of action of the clamp, but bottoms in a socket 71 in the other clamp member when screw 69 is tightened. This permits the clamp to be shifted without disturbing the adjustment of the arm relatively thereto.

It is believed that the operation of the system has been fully explained in connection with the description of the structure thereof and that no further explanation on this score is needed.

It will thus be seen that I have produced a simple and novel conveyor system that makes possible the sending of papers and other light articles directly to an indefinite number of receiving stations with a minimum number of belts and have made it possible to utilize one of the belts and a simple trough to permit articles to be sent back to the master station from any receiving station. It will also be seen that the work of the operators is easy, the sender at the master station needing only to insert papers or other articles in receptacles each having substantially a whole side open, while senders at other stations need simply drop articles in a conveniently located trough to ensure their transportation to the master station. All material that is received at any station enters large open boxes from which it can easily be removed. It will further be seen that my improved roller supporting bracket is very simple and sturdy and permits adjustments of the rollers to be made quickly and easily over a much wider range than heretofore.

I claim:

A conveyor system comprising a sending station and a plurality of receiving stations, a long horizontal trough extending from the sending station past each receiving station and terminating at the most remote one, the bottom of the trough having large openings at the receiving stations, as many belts as there are stations extending from the sending station through said trough while lying flat upon each other, the belt which is at the bottom of the trough at any given receiving station passing down through the corresponding opening and returning to the sending station; a second horizontal trough for the returning portions of all belts, except the two outer belts, reaching from the sending station past all of the receiving stations except the one that is most remote from the sending station, said second trough being interrupted at the stations which it passes, and including in the gap in the second trough at each such station a receptacle to receive articles intended for that station; each such receptacle having at the bottom a tunnel through which the rearwardly movable belts in the second trough pass; and a third horizontal trough containing the portions of the two outer belts returning from the most remote station to the sending station.

FRANK J. BLUME.

REFERENCES CITED

The following references are of record in the file of this patent:

UNITED STATES PATENTS

| Number | Name | Date |
| --- | --- | --- |
| 1,103,635 | Vail | July 14, 1914 |
| 1,158,078 | Sauer | Oct. 26, 1915 |
| 1,384,520 | Ditson | July 12, 1921 |
| 1,684,953 | Everett | Sept. 18, 1928 |
| 1,997,360 | Crozier | Apr. 9, 1935 |
| 2,028,235 | Needham | Jan. 21, 1936 |
| 2,076,493 | Beardsley | Apr. 6, 1937 |

FOREIGN PATENTS

| Number | Country | Date |
| --- | --- | --- |
| 452,725 | Great Britain | Aug. 27, 1936 |